March 9, 1926. 1,576,431
T. C. BLACKBURN
CHAIN LINK
Filed Dec. 12, 1923
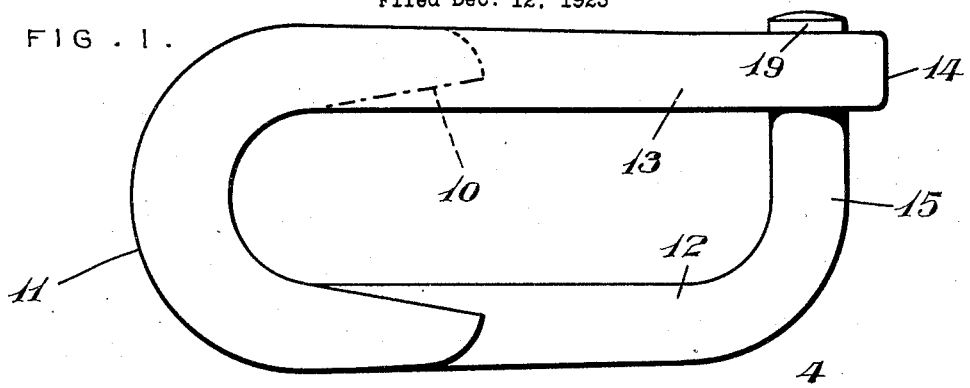
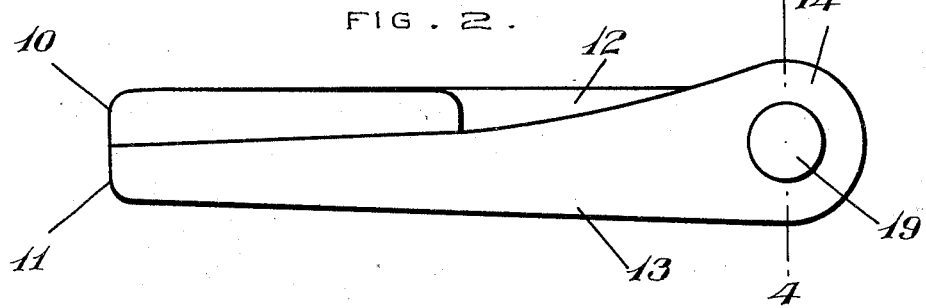
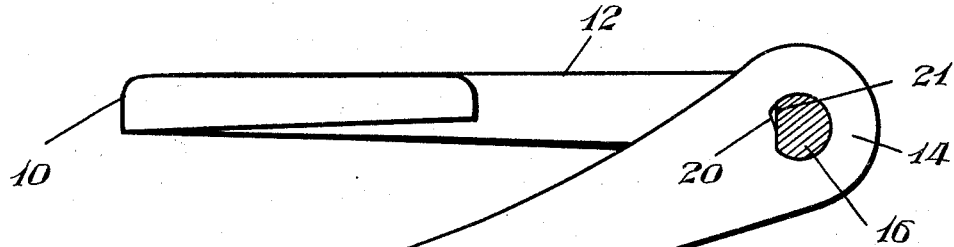
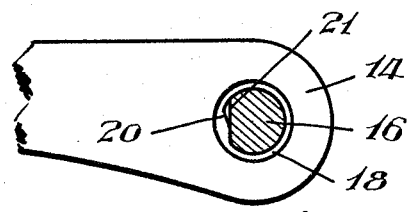
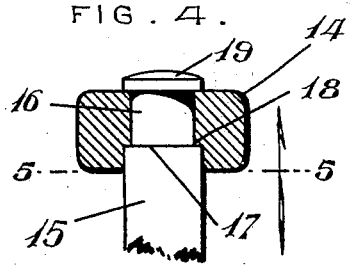
Inventor:
T. C. BLACKBURN
By Monroe E. Miller
Attorneys Patented Mar. 9, 1926.

1,576,431

UNITED STATES PATENT OFFICE.

THOMAS C. BLACKBURN, OF WINNFIELD, LOUISIANA.

CHAIN LINK.

Application filed December 12, 1923. Serial No. 680,174.

*To all whom it may concern:*

Be it known that I, THOMAS C. BLACKBURN, a citizen of United States, residing at Winnfield, in the parish of Winn and State of Louisiana, have invented certain new and useful Improvements in Chain Links, of which the following is a specification, reference being had therein to the accompanying drawing.

The present invention relates to chain links, such as are used as repair links to replace broken links of a chain, or which may be used as couplings for chains and other members, and it is the object of the invention to provide a novel and improved device of that kind, which can be conveniently opened and closed and which will be strong and durable.

Another object is the provision of such a link which can be easily and economically manufactured, and which has means for limiting the opening or separating movement of the sections or parts, in order to avoid the accidental separation of the chain links or members connected by the present link.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawing, wherein—

Figure 1 is a side elevation of the improved link.

Fig. 2 is an edge view of the link showing same in closed position.

Fig. 3 is an edge view showing the link in open position, the pivot stud being shown in section.

Fig. 4 is a section on the line 4—4 of Fig. 2.

Fig. 5 is a section on the line 5—5 of Fig. 4.

The two sections or parts of the link have the hooks 10 and 11 to overlap one another in reversed positions, and said hooks have the respective shanks 12 and 13 which are parallel with one another in the closed position of the link. The shank 13 terminates at that end opposite to the hook 11 in a flat eye 14, and the terminal 15 of the shank 12 opposite to the hook 10 is bent at a right angle toward the shank 13 and constitutes the end of the link opposite to the end composed of the overlapping hooks 10 and 11.

The two sections are pivotally connected to swing open and closed, and, for this purpose, the terminal 15 has a reduced portion or stud 16 arranged transversely of the link and fitted pivotally in the aperture of the eye 14, whereby the sections or shanks 12 and 13 can be swung relatively to one another about an axis transversely of the link. The reduced portion or stud 16 forms a shoulder 17 on the terminal 15, and the aperture of the eye 14 is double diametered to form a shoulder 18 between the opposite sides of the eye. The terminal 15 extends into the larger diametered portion of the eye so that the shoulder 17 abuts the shoulder 18, and the stud 16 is disposed within the smaller diametered portion of the eye, to provide a snug fit and a substantial pivot joint. The stud 16 is swaged against the eye 14 to provide a rivet head 19 overlapping said eye, to hold the parts together.

In order to limit the opening or separating movement of the link sections, the stud 16 and aperture of the eye 14 are so formed as to limit the relative turning movement of the parts. Thus, the aperture of the eye 14 and the cross-section of the stud 16 are less than a complete circle, and as shown, the aperture of the eye between the shoulder 18 and side of the eye against which the head 19 bears, has a lug or portion 20 to contact against the flattened side 21 of the stud 16, thereby limiting the separation of the hooks 10 and 11, as seen in Fig. 3. Therefore, although the hooks can be separated to enable the chain links or other members to be engaged in the link, the opening movement of the link is limited, in order to avoid accidental disconnection of the chain links or members, when slackened, inasmuch as the present link can only open a small amount. This reduces to a minimum the possibility of the link opening sufficiently to let the chain sections or members become disconnected which are connected by the present link.

Having thus described the invention, what is claimed as new is:—

A link of the character described comprising a pair of shanks having hooks to overlap in reversed positions, one shank having an eye, the other shank having a terminal portion fitted for pivotal movement in said eye, said terminal portion being of parti-circular cross section with a flat side, and the aperture of the eye being less than a circle, said eye having an integral portion arranged to abut said flat side of said terminal portion to limit the swinging movement of the shanks away from one another.

In testimony whereof I hereunto affix my signature.

THOMAS C. BLACKBURN.